United States Patent
Hu et al.

(10) Patent No.: US 11,748,628 B2
(45) Date of Patent: Sep. 5, 2023

(54) METHOD FOR OPTIMIZING RESERVOIR OPERATION FOR MULTIPLE OBJECTIVES BASED ON GRAPH CONVOLUTIONAL NEURAL NETWORK AND NSGA-II ALGORITHM

(71) Applicant: HOHAI UNIVERSITY, Nanjing (CN)

(72) Inventors: Hexuan Hu, Nanjing (CN); Qiang Hu, Nanjing (CN); Ye Zhang, Nanjing (CN); Zhenyun Hu, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 0 days.

(21) Appl. No.: 17/909,032

(22) PCT Filed: Oct. 21, 2021

(86) PCT No.: PCT/CN2021/125239
§ 371 (c)(1),
(2) Date: Sep. 2, 2022

(87) PCT Pub. No.: WO2022/193642
PCT Pub. Date: Sep. 22, 2022

(65) Prior Publication Data
US 2023/0196114 A1 Jun. 22, 2023

(30) Foreign Application Priority Data
Mar. 15, 2021 (CN) .......................... 202110275101.X (51) Int. Cl.
*G06N 3/086* (2023.01)
*G06Q 50/06* (2012.01)
*G06N 3/0464* (2023.01)

(52) U.S. Cl.
CPC .......... *G06N 3/086* (2013.01); *G06N 3/0464* (2023.01); *G06Q 50/06* (2013.01)

(58) Field of Classification Search
CPC .............................. G06N 3/086; G06N 3/0464
See application file for complete search history.

(56) References Cited

U.S. PATENT DOCUMENTS
2019/0147537 A1    5/2019   Kessaci et al.

FOREIGN PATENT DOCUMENTS
CN       105243458 A       1/2016
CN       106056267 A      10/2016
(Continued)

OTHER PUBLICATIONS

RengFang Huang et al., "Multi-objective optimization of mixed-flow pumpl impeller using modified NSGA-II algorithm" (2015) (Year: 2015).*

(Continued)

*Primary Examiner* — Alexey Shmatov
*Assistant Examiner* — Beatriz Ramirez Bravo
(74) *Attorney, Agent, or Firm* — HAUPTMAN HAM, LLP (57) ABSTRACT

A method for optimizing a reservoir operation for multiple objectives based on a GCN and a NSGA-II algorithm. The method includes collecting relevant data for reservoir flood-control operation and establishing a multi-objective optimization model for the flood control. An initial population is obtained. Grouping individuals by an encoding operation and the grouped classifications are nodes of the GCN, and mapping parent-child relationships obtained by crossover and mutation operations as edges between the nodes in the GCN. A preliminary Pareto frontier is obtained, abscissas of the preliminary Pareto frontier are grouped and labeled, and a GCN model is trained by using the grouping labels and the graphic structure obtained in Step 2. The nodes in the graphic structure are classified by using the trained GCN model, and a uniformity of the Pareto frontier is adjusted. A (Continued)

set of non-inferior schemes of the multi-objective optimization problem for the reservoir operation is output.

5 Claims, 3 Drawing Sheets

(56) References Cited

FOREIGN PATENT DOCUMENTS

| CN | 109948847 A | 6/2019 |
|---|---|---|
| CN | 110428099 A | 11/2019 |
| CN | 112966805 A | 6/2021 |

OTHER PUBLICATIONS

Liu et al. "A dynamic multi-objective optimization model with interactivity and uncertainty for real-time reservoir flood control operation" (2019) (Year: 2019).*

Hojjati et al., "Application and comparison of NSGA-II and MOPSO in multi-objective optimization of water resources systems" (2018) (Year: 2018).*

Written Opinion in corresponding International Application No. PCT/CN2021/125239, dated Jan. 19, 2022; 8 pgs.

* cited by examiner

METHOD FOR OPTIMIZING RESERVOIR OPERATION FOR MULTIPLE OBJECTIVES BASED ON GRAPH CONVOLUTIONAL NEURAL NETWORK AND NSGA-II ALGORITHM

RELATED APPLICATIONS

The present application is a U.S. National Phase of International Application Number PCT/CN2021/125239 filed Oct. 21, 2021 and claims priority to Chinese Application Number 202110275101.X filed Mar. 15, 2021.

TECHNICAL FIELD

The present disclosure belongs to the field of a multi-objective optimization for a reservoir operation in the water conservancy industry, and relates to a method for optimizing a reservoir operation for multiple objectives based on a graph convolutional neural network and a NSGA-II algorithm.

BACKGROUND

During flood seasons, comprehensive factors such as the dam level of the reservoir and the safety in the downstream need to be taken into consideration for the reservoir operation. If only one objective lowering the water level in the reservoir is considered, it may result in low environmental efficiencies. Therefore, it is necessary to consider multiple objectives to adjust the discharge volume at each stage to obtain a solution set that can make the environmental efficiencies and flood-control efficiencies non-inferior. Users select the operation scheme as required. Whereas in the previous researches, traditional methods, such as a particle swarm algorithm and a genetic algorithm and dynamic programming method, are commonly adopted to solve the operation scheme, in which problems such as a dimensional disaster and a slow convergence speed commonly occur when the model is complex. Using the GCN NSGA-II (Non-Dominated Sorting Genetic Algorithm) algorithm to search the Pareto frontier can be used in the multi-objective optimization model for the flood control to search the Pareto frontier in the model.

The NSGA-II algorithm is a multi-objective optimization algorithm based on a Pareto non-inferior solution, which inherits a global searching ability of the traditional genetic algorithms, and has an elite strategy and a fast non-dominated sorting, and therefore, the algorithm has an excellent effect in rapidly searching the Pareto frontier and maintaining the population diversity. Whereas in real life, many data do not have a regular spatial structure, the graph neural network can model the data in non-Euclidean spaces by using the particularity of the graphic structure, and capturing the internal dependencies of data has great advantages in mining the node characteristics in the graph.

The patent application (CN110428099A) discloses a method for optimizing an agricultural operation line and an urban water supply capacity based on a particle swarm algorithm, which obtains a maximum water supply capacity that meets the requirements on a certain double guarantee rate of agricultural irrigation water and urban water, and solves the problem that the prior art cannot deal with the multi-objective and multi-guarantee rate. However, the particle swarm algorithm is prone to losing the diversity of the population in the searching spaces, thereby being stuck in the problem of local minimum and being not capable of guaranteeing the global searching. The patent application (CN109948847A) discloses a multi-objective evolutionary algorithm applied to a reservoir group operation. The disclosure improves the fact in the traditional third-generation non-dominated sorting genetic algorithm (NSGA-III) that the parent population is randomly selected for reproduction by performing two rounds of tournament selections and a vector angle selection, and provides a multi-objective evolutionary algorithm (VA-NSGA-III) based on a reference point and a vector angle selection. Nevertheless, due to the method provided by this patent, the selection operation during population evolution becomes more complicated, which also increases the computational complexity; and is not conducive to improving the convergence speed of the Pareto frontier.

SUMMARY

The objectives of the present disclosure are to eliminate the defects of the prior art and to provide a method for optimizing a reservoir operation for multiple objectives based on a graph convolutional neural network and a NSGA-II algorithm. The present disclosure is applied to a multi-objective reservoir optimization operation, which can rapidly provide a set of reservoir optimization operation schemes that satisfies all objectives, thereby facilitating the decision makers to select an optimal scheme.

In order to solve the above technical problems, the following technical solutions are adopted in the present disclosure.

Provided in the present disclosure is a method for optimizing a reservoir operation for multiple objective based on a graph convolutional neural network and a NSGA-II algorithm. The method includes the following steps.

In Step 1, relevant data for reservoir flood-control operation are collected and a multi-objective optimization model for the reservoir operation is established.

In Step 2, an initial population of a multi-objective optimization problem for the reservoir operation is obtained by using the NSGA-II algorithm, individuals in the population are grouped by an encoding operation and the individuals are marked with classifications, each of which is taken as a node in a GCN graphic structure, and parent-child relationships obtained by crossover and mutation operations are mapped as edges between the nodes in the GCN graphic structure, to obtain the GCN graphic structure and a preliminary Pareto frontier.

In Step 3, abscissas of the preliminary Pareto frontier obtained in Step 2 are grouped and labeled, and then a GCN model is trained by using the grouping labels and the GCN graphic structure obtained in Step 2.

In Step 4, the nodes in the GCN graphic structure are classified by using the trained GCN model, and then a uniformity of the Pareto frontier is adjusted by using the NSGA-II algorithm until an algorithm iteration ends, to obtain a more uniform Pareto frontier.

In Step 5, according to the more uniform Pareto frontier obtained in Step 4, a set of non-inferior schemes of the multi-objective optimization problem for the reservoir operation is output.

Furthermore, objectives considered in the multi-objective optimization model for the reservoir operation in Step 1 include as follows.

Firstly, an upstream water level is minimized and it is ensured that the reservoir maintains a low water level during a flood season, so as to effectively ensure safety of a dam. Secondly, a maximum discharge volume in the reservoir is minimized, and the reservoir stores as much floodwater as possible to ensure safety in a downstream to minimize an inundation loss.

Moreover, a process of Step 2 specifically includes as follows.

In Step 2.1, the population of the multi-objective optimization problem for the reservoir operation is randomly initialized, the individuals of the populations are encoded according to a following encoding method, and the encoded individual classifications are taken as the nodes in the GCN graphic structure; through the encoding method, a plurality of individuals in the population belong to the same classification represented by the same node, to avoid a redundancy in the graphic structure caused by too many individuals in the population.

The encoding method is that: a definition domain of the maximum discharge volume Qmax is divided at an equal distance, then each distance is $\lceil Q_{max}/N \rceil$, and then the individuals are encoded by using a method $[Q/\lceil Q_{max}/N \rceil]$, where Qmax is the maximum discharge volume, N is a number of classifications, that is, a number of nodes in the GCN graphic structure; the Pareto frontier is divided at an equal distance according to the abscissas, intervals of which are defined as 0, 1, 2 . . . , where a node 0 is defined as an elimination node, and a length of a gene sequence in the population is determined by a number of variables.

In Step 2.2, the crossover and mutation operations are performed on the individuals in the population in Step 2.1 to determine whether the constraint conditions are satisfied, and codes in the gene sequence of eliminated individuals that satisfy the constraint conditions are pointed to the node 0; the individuals that satisfy the conditions are recorded, and at the same time the parent-child relationships generated by the crossover and mutation operations are defined as the edges of the graphic structure.

In addition, a process of Step 3 specifically includes as follows.

In Step 3.1, the preliminary Pareto frontier obtained by the NSGA-II algorithm is grouped and labeled according to the abscissas, that is, a value domain of an objective function is divided at an equal distance, to define digital labels.

In Step 3.2, input parameters are set, relationships between the individuals in the population are represented as an adjacency matrix $A \in R^{N \times N}$ in the graph convolutional neural network, and a characteristic matrix $X \in R^{N \times D}$ is initialized.

In Step 3.3, an input layer with N individuals is taken as a first portion, that is, an N-layered input layer is constituted by N nodes in the graph, and the characteristic matrix X and the adjacency matrix A are taken as inputs.

In Step 3.4, a convolutional layer composed of two layers of graph convolutions is taken as a second portion, and characteristics of a base layer are transmitted to a next layer by trigging information transmission of the edges between the two layers.

In Step 3.5, an output layer is taken as a third portion, for the characteristic matrix X obtained by calculating and transmitting of the two layers of the convolutional layers, a classification probability at each of the nodes is output through an activation function.

Additionally, a process of Step 4 specifically includes as follows.

In Step 4.1, the preliminary Pareto frontier is obtained by the NSGA-II algorithm through selection, crossover and mutation operations, during this process, relationships of a parent-child tree-shaped structure is generated between the individuals in the population of the multi-objective optimization problem for the reservoir operation and the tree-shaped structure is converted into the GCN graphic structure.

In Step 4.2, whether a population iteration threshold being satisfied is determined, if so, the GCN is started to be trained, node characteristics in a population evolution relationship graphic network are learned, and a node classification result is made correspond to a classification of the Pareto frontier.

In Step 4.3, the nodes are classified by using the GCN, and then the individuals in the Pareto frontier are adjusted through a loop iteration by using the NSGA-II algorithm, which specifically includes following steps.

In Step 4.3.1, the nodes are classified by using the GCN, and the preliminary Pareto frontier is supplemented and improved.

In Step 4.3.2, the nodes with different classifications in the Pareto frontier are traversed, redundant nodes with the same classification are deleted, the population of the classifications with a fewer number is increased to increase differences.

In Step 4.3.3, crossover and mutation operations are performed on the nodes with a good performance obtained through the GCN classification by using the NSGA-II algorithm to obtain new nodes.

In Step 4.3.4, whether the nodes satisfy the constraint conditions is determined, and if so, the nodes are retained.

Compared with the prior art, the present disclosure has the following advantages and beneficial effects.

1. In the present disclosure, for the multi-objective optimization problem of the reservoir during flood seasons, two objectives of the lowest dam level and the minimum discharge flow are considered, and the safety of the reservoir and the ecological health problem in the downstream are taken into account, which are also the main objectives of the multi-objective optimization problem of the reservoir operation during flood seasons. Due to the conflict between these two objectives, and the fact that it needs to consider a series of constraint conditions for the problem, it cannot be simply tackled as a single-objective problem. The NSGA-II algorithm has been always used to tackle the multi-objective optimization problem and has been widely used. The advantages of the NSGA-II algorithm, such as the fast convergence and strong global searching ability at the early stage of the algorithm, are inherited by the algorithm in the present disclosure, which also enables the algorithm in the present disclosure to have a good effect in tackling the multi-objective optimization problem of the reservoir operation during flood seasons to obtain a satisfactory Pareto solution set.

2. In the present disclosure, a graph convolutional neural network is introduced, in which the parent-child relationships between individuals generated in the population evolution process of the multi-objective optimization problem are transformed into nodes of the GCN graphic structure through encoding operations so as to train the GCN model. The graph convolutional neural network can well mine the relationships between the nodes in the graphic structure, and learn the node characteristics, thereby accurately performing the classification, and thereby improving the problems of poor local searching and slow convergence speed in the NSGA-II algorithm. At the later stage of the NSGA-II algorithm, GCN classification is used in the algorithm provided by the present disclosure, instead of using the strategies, such as calculating the crowding distance, of the NSGA-II algorithm, to achieve the objectives of reducing computational costs and improving speed. Eventually, the NSGA-II algorithm is used to optimize and adjust the GCN classification results to obtain an improved Pareto frontier, which ensures the uniformity of the Pareto frontier. In the present disclosure, a set of reservoir optimization operation schemes during flood seasons that satisfies all objectives can be rapidly provided.

DETAILED DESCRIPTION OF THE EMBODIMENTS

The present disclosure is a method for optimizing a reservoir operation for multiple objectives based on a graph convolutional neural network and a NSGA-II algorithm, which optimizes the discharge volume of the reservoir during each time period, and obtains a set of non-inferior schemes of the multi-objective optimization problem for the reservoir operation. Relevant data for reservoir flood-control operation are collected and a multi-objective optimization model for the reservoir operation is established. An initial population of the multi-objective optimization problem for the reservoir operation is obtained by using the NSGA-II algorithm. Individuals in the population are grouped by an encoding operation and the individuals are labeled with classifications, each of which serves as a node in a GCN graphic structure, and parent-child relationships obtained by crossover and mutation operations are mapped as edges between the nodes in the GCN graphic structure, to obtain the GCN graphic structure and a preliminary Pareto frontier. Abscissas of the obtained preliminary Pareto frontier are grouped and labeled, and then a GCN model is trained by using the grouping labels and the obtained GCN graphic structure. The nodes in the GCN graphic structure are classified by using the trained GCN model, then the uniformity of the Pareto frontier is adjusted by using the NSGA-II algorithm until the algorithm iteration ends, and a more uniform Pareto frontier is obtained. A set of non-inferior schemes of the multi-objective optimization problem for the reservoir operation is output according to the Pareto frontier adjusted by using the NSGA-II algorithm.

Provided in the present disclosure is a method for optimizing a reservoir operation for multiple objectives based on a graph convolutional neural network and a NSGA-II algorithm. The method includes the following steps.

In Step 1, relevant data for reservoir flood-control operation are collected and a multi-objective optimization model for the reservoir operation is established.

In Step 2, an initial population of a multi-objective optimization problem for the reservoir operation is obtained by using the NSGA-II algorithm, individuals in the population are grouped by an encoding operation and the individuals are labeled with classifications, each of which serves as a node in a GCN graphic structure, and parent-child relationships obtained by crossover and mutation operations are mapped as edges between the nodes in the GCN graphic structure, to obtain the GCN graphic structure and a preliminary Pareto frontier.

In Step 3, abscissas of the preliminary Pareto frontier obtained in Step 2 are grouped and labeled, and then a GCN model is trained by using the grouping labels and the GCN graphic structure obtained in Step 2.

In Step 4, the nodes in the GCN graphic structure are classified by using the trained GCN model, then a uniformity of the Pareto frontier is adjusted by using the NSGA-II algorithm until an algorithm iteration ends, and a more uniform Pareto frontier is obtained.

In Step 5, according to the more uniform Pareto frontier obtained in Step 4, a set of non-inferior schemes of the multi-objective optimization problem for the reservoir operation is output.

Objectives considered in the multi-objective optimization model for the reservoir operation in Step 1 include the followings. Firstly, an upstream water level is minimized to ensure that the reservoir maintains a low water level during a flood season, thereby effectively ensuring the safety of a dam. Secondly, a maximum discharge flow in the reservoir is minimized, and the reservoir stores as much floodwater as possible to ensure safety in the downstream to minimize an inundation loss.

Step 2 specifically includes the followings.

In Step 2.1, the population of the multi-objective optimization problem for the reservoir operation is randomly initialized. The individuals in the population are encoded according to a following encoding method, and encoded individual classifications are taken as the nodes in the GCN graphic structure. Through the encoding method, a plurality of individuals in the population belong to the same classification and are represented by the same node, to avoid a redundancy in the graphic structure caused by too many individuals in the population.

The encoding method is that: a definition domain of the maximum discharge flow Qmax is divided at an equal distance, then each distance is $\lceil Q_{max}/N \rceil$, where Qmax is the maximum discharge volume, and N is a number of classifications, that is, a number of nodes in the GCN graphic structure. The individuals are encoded by using a method $\lceil Q/\lceil Q_{max}/N \rceil \rceil$. The Pareto frontier is divided at an equal distance by the abscissas, intervals of which are defined as 0, 1, 2 ..., where a node 0 is defined as an elimination node, and a length of a gene sequence in the population is determined by a number of variables.

In Step 2.2, the crossover and mutation operations are performed on the individuals in the population in Step 2.1 to determine whether the constraint conditions are satisfied, and codes in the gene sequence of eliminated individuals that satisfy the constraint conditions are pointed to the node 0. The individuals that satisfy the conditions are recorded, and at the same time the parent-child relationships generated by the crossover and mutation operations are defined as the edges of the graphic structure.

Step 3 specifically includes the followings.

In Step 3.1, the preliminary Pareto frontier obtained by the NSGA-II algorithm is grouped and labelled according to the abscissas, that is, a value domain of an objective function is divided at an equal distance, to define digital labels.

In Step 3.2, input parameters are set. Relationships between the individuals in the population are represented as an adjacency matrix $A \in R^{N \times N}$ in the graph convolutional neural network, and a characteristic matrix $X \in R^{N \times D}$ is initialized.

In Step 3.3, an input layer with N individuals is taken as a first portion, that is, an N-layered input layer is constituted by N nodes in the graph. The characteristic matrix X and the adjacency matrix A are taken as inputs.

In Step 3.4, a convolutional layer composed of two layers of graph convolutions is taken as a second portion, and characteristics of a base layer are transmitted to a next layer by triggering information transmission of the edges between the two layers.

In Step 3.5, an output layer is taken as a third portion, for the characteristic matrix X obtained by calculating and transmitting of the two layers of the convolutional layers, a classification probability of each of the nodes is output through an activation function.

Step 4 specifically includes the followings.

In Step 4.1, the preliminary Pareto frontier is obtained by the NSGA-II algorithm through selection, crossover and mutation operations. During this process, relationships of a parent-child tree-shaped structure are generated between the individuals in the population of the multi-objective optimization problem for the reservoir operation, and the tree-shaped structure is converted into the GCN graphic structure.

In Step 4.2, whether a population iteration threshold is satisfied is determined. If so, it starts to train the GCN, to learn node characteristics in a population evolution relationship graphic network, and to make a node classification result corresponding to a classification of the Pareto frontier.

In Step 4.3, the nodes are classified by using the GCN, and then the individuals in the Pareto frontier are adjusted through a loop iteration by using the NSGA-II algorithm, which specifically includes following steps.

In Step 4.3.1, the nodes are classified by using the GCN, and the preliminary Pareto frontier is supplemented and improved.

In Step 4.3.2, the nodes with different classifications in the Pareto frontier are traversed, redundant nodes with the same classification are deleted, and the population of the classifications with a fewer number is increased to increase differences.

In Step 4.3.3, crossover and mutation operations are performed on the nodes with a good performance obtained through the GCN classification by using the NSGA-II algorithm to obtain new nodes.

In Step 4.3.4, whether the nodes satisfy the constraint conditions is determined, and if so, the nodes are retained.

The present disclosure will be further described in detail below in conjunction with the accompanying drawings.

Figure 1:
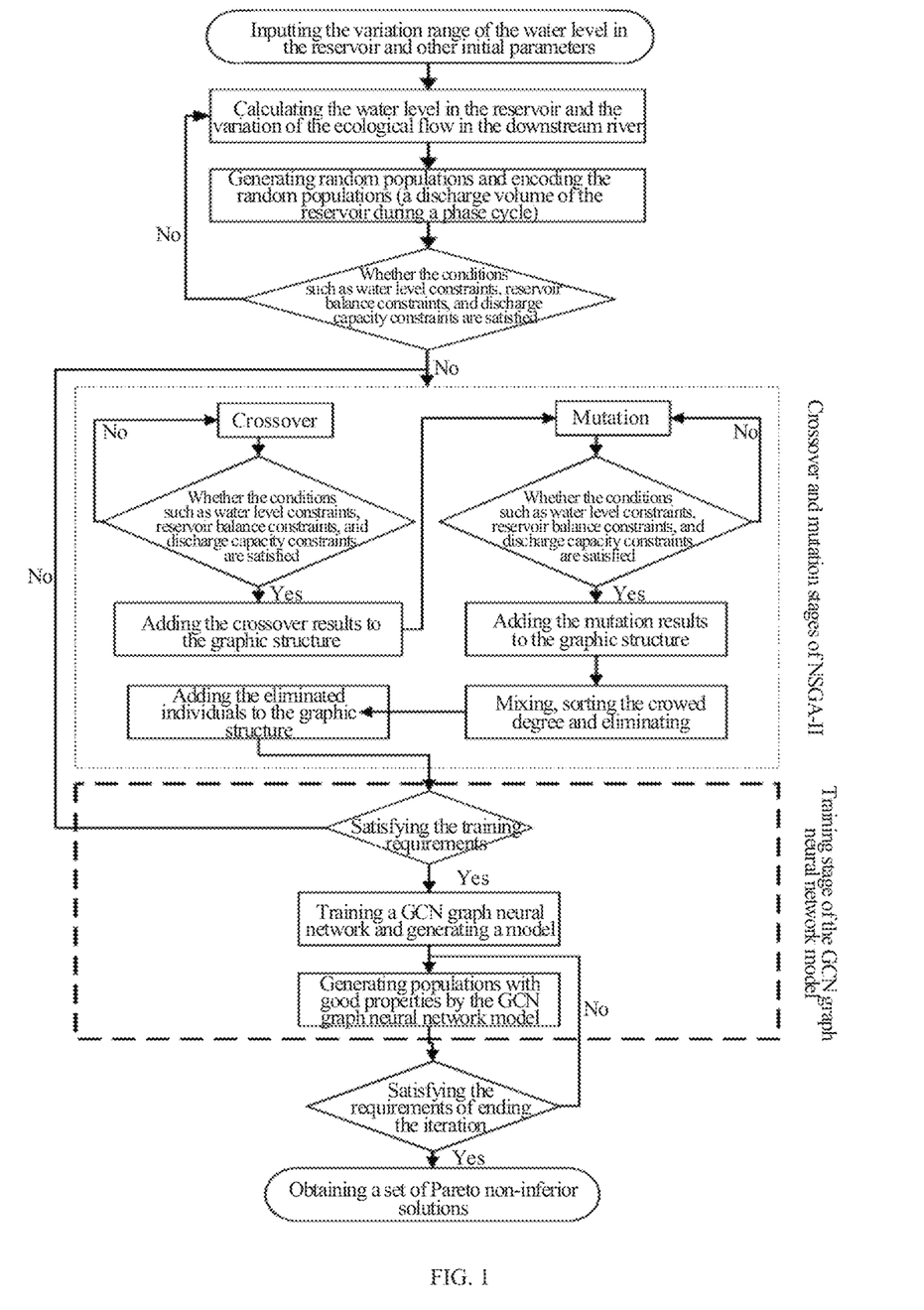
FIG. 1 illustrates a flow chart of a method for optimizing a reservoir operation for multiple objectives based on a graph convolutional neural network and a NSGA-II algorithm according to an embodiment of the present disclosure.
Figure 2:
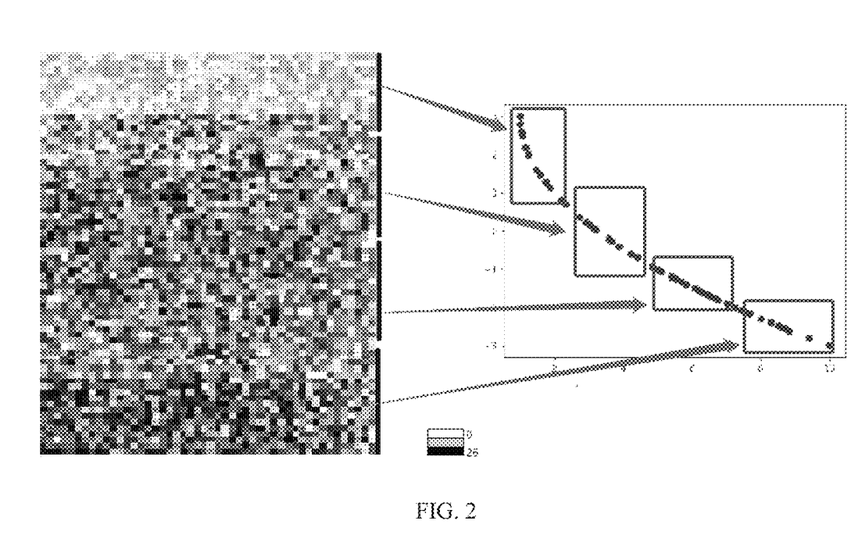
FIG. 2 illustrates a gene code and a pareto classification of GCN classification results in an individual relationship graphic network according to an embodiment of the present disclosure.
Figure 3:
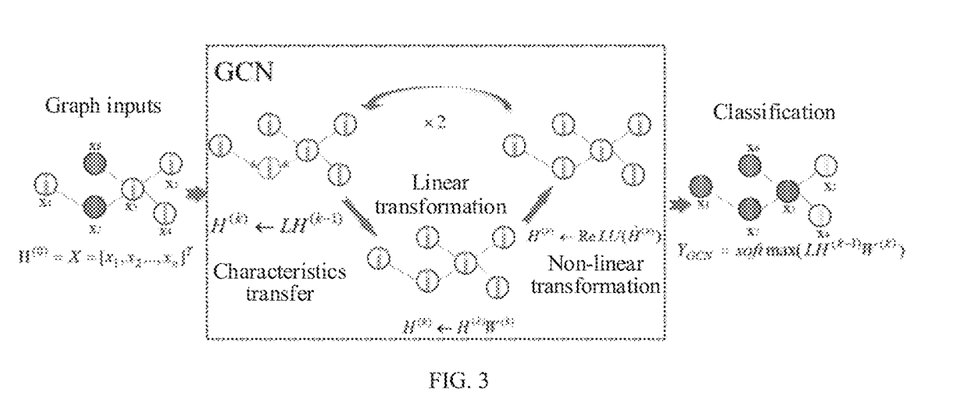
FIG. 3 illustrates a structural diagram of a graph convolutional neural network, including an input layer, a convolutional layer, and an output layer according to an embodiment of the present disclosure.

FIG. 1 illustrates a flow chart of a method for optimizing a reservoir operation for multiple objectives based on a graph convolutional neural network and a NSGA-II algorithm according to an embodiment of the present disclosure. FIG. 2 illustrates a gene code and a pareto classification of GCN classification results in an individual relationship graphic network according to an embodiment of the present disclosure. FIG. 3 illustrates a structural diagram of a graph convolutional neural network including an input layer, a convolutional layer, and an output layer according to an embodiment of the present disclosure. As illustrated in FIGS. 2 and 3, the method for optimizing the reservoir operation for the multiple objectives based on the graph convolutional neural network and the NSGA-II algorithm provided by the present disclosure is applied to the multi-objective optimal problem of the flood-control operation in the Xiaolangdi Reservoir to obtain the Pareto frontier of the multi-objective optimization problem.

As illustrated in FIG. 1, the method according to the embodiments of the present disclosure includes the following steps.

In Step 1, data such as a storage capacity, a maximum discharge capacity, a water inflow during a flood season and a natural water requirement in the Xiaolangdi Reservoir are collected to establish a multi-objective optimal model for flood-control operation, which includes the followings.

In 1.1, the data such as the storage capacity, the maximum discharge capacity, the water inflow during the flood season and the natural water requirement in the reservoir are collected, which are specifically as follows.

Xiaolangdi Hydro Project is located on the main stream of the Yellow River 40 km north of Luoyang City, Henan Province, the upstream of which is Sanmenxia Hydro Project, and the downstream of which is Huayuankou Reservoir in Zhengzhou. The dam site controls a watershed area of 6940000 km² that accounts for 95.1% of the watershed area before Huayuankou. The construction objectives of the Xiaolangdi reservoir are mainly to prevent floods and reduce siltation, while taking into account of water supply, irrigation and power generation. A designed normal water storage level is 275 m (Yellow Sea elevation), a check flood level for one time occurrence in ten thousand years is 275 m and a designed flood level for one time occurrence in one thousand years is 274 m. A total designed storage capacity is 12.65 billion m³, including 7.55 billion m³ for a sediment storage capacity, 4.05 billion m³ for a flood-control storage capacity, and 1.05 billion m³ for a storage capacity for water and sediment operation. The highest level for flood-control operation is 275.0 m and the corresponding storage capacity is 9.422 billion m³.

In 1.2, the multi-objective optimal model for the flood-control operation is established.

In 1.2.1, the lowest dam level is $MinF_1=Min\{MaxZ_t\}$, where $Z_t$ represents the dam level during the t-th time period.

In 1.2.2, the minimum of the maximum discharge flow is $MinF_2=Min\{MaxQ_t\}$, where $Q_t$ represents the discharge flow of the reservoir during the t-th time period in the operation period.

In 1.2.3, the constraint conditions are as follows.

1. A dam level constraint is $Z_{t,min}(230 \text{ m})<Z_t<Z_{t,max}(275 \text{ m})$ where $Z_{t,min}$ and $Z_{t,max}$ represent a minimum and maximum water level constraint during the t-th time period in the reservoir operation period, respectively; and $Z_t$ is the dam level of the reservoir during the t-th time period.

2. A reservoir balance constraint is $V_t=V_{t-1}+(I_t-Q_t)\Delta t$, where $V_t$ represents the storage capacity of the reservoir during the t-th time period; and $I_t$ and $Q_t$ represent the inflow and discharge flow of the reservoir during the t-th time period, respectively.

3. A discharge capacity constraint is $Q \leq Q_{max}(14900 \text{ m}^3/\text{s})$, where $Q_{max}$ represents a maximum discharge capacity of the reservoir under the corresponding water level.

In Step 2, the graphic structure of the graph convolutional neural network (GCN) is established by reproducing the offspring through the NSGA-II algorithm.

In Step 2.1, the number of individuals in the population is randomly initialized to 50, and the population is encoded according to a certain encoding method, as illustrated in FIG. 2.

The range of the discharge volume is divided at an equal distance, and then each distance is $\lceil Q_{max}/N \rceil$, where $Q_{max}$ represents the maximum discharge volume, and N is the number of classifications. The individuals are encoded in the manner of $\lceil Q/\lceil Q_{max}/N \rceil \rceil$, and N is selected as 26, that is, it is divided into 26 classifications, i.e., the first classification is Qt∈ [0, 573]. It is set to satisfy that the algebraic threshold is 40. The Pareto frontier is to be divided at an equal distance length of 0.00016 by the abscissas if excess of 40 generations, The 0 node is initialized as the elimination node, and [1, 2, 3, 4] are the classifications on the Pareto frontier, respectively. These five nodes of 0 to 4 become the source nodes, and the length of the gene sequence in the population is determined as 72 by the number of variables.

In Step 2.2, the crossover and mutation operations are performed on the individuals in the population to determine whether the constraint conditions are satisfied. Codes in the gene sequence of eliminated individuals that satisfy the constraint conditions are pointed to the node 0. The individuals that satisfy the conditions are recorded, and at the same time, the results of crossover and mutation, that is, the individual relationships of the parent-child relationships, are recorded.

In Step 2.3, according to the population obtained by the NSGA-II algorithm the parent-child tree-shaped structure is converted into the graphic structure, that is, the population evolution relationship graphic network G, required by the GCN.

In Step 3, the relationships between the nodes are mined through the GCN, and the characteristics of the nodes are continuously enriched to train the GCN, as illustrated in FIG. 3.

In Step 3.1, input parameters are set, relationships between the individuals in the population are represented as an adjacency matrix A in the graph convolutional neural network, and a specific characteristic matrix X is determined by the reachable lengths of the paths in the graph.

In Step 3.2, an input layer with 50 individuals is taken as a first layer, that is, 50 nodes and 5 source nodes, i.e. 55 nodes, in the graph form the input layer, and the above-mentioned characteristic matrix and the adjacency matrix A serve as inputs.

Figure 4:
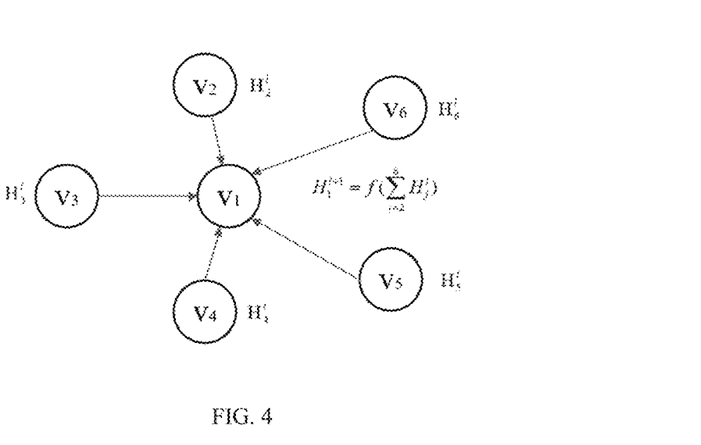
FIG. 4 illustrates a schematic diagram of a node-information transmission rule in a graphic structure according to an embodiment of the present disclosure.

In Step 3.3, a convolutional layer composed of two layers of graph convolutions is taken as a second layer, and the transmission between the two layers is based on the following transfer rules:

$$f(H^{(1)}, A) = \sigma\left(\hat{D}^{-\frac{1}{2}} \hat{A} \hat{D}^{-\frac{1}{2}} H^{(1)} W^{(1)}\right),$$

where characteristics of this layer are transmitted to a next layer by triggering the information transmission of the edges, as illustrated in FIG. 4.

In Step 3.4, the last layer is the output layer. The characteristic matrix Z, that is, the classification probability of each node, obtained by the calculation and the transmission of the above-mentioned two layers of the convolutional layers is output through the function softmax.

In Step 4, the GCN nodes are classified, and the nodes with good classification results continue to be reproduced through NSGA-II to adjust the performance of the nodes.

In Step 4.1, through the evolution processes (crossover, mutation and elimination) of individuals in the NSGA-II genetic algorithm, the evolution processes of the individuals are modelled into a population relationship network graph.

In Step 4.2, whether the population iteration threshold (the threshold is 100 generations) is satisfied is determined. If it is satisfied, the graph convolutional neural network provided in Step 3 is applied to the population relationship network graph to learn the direct relationships between the nodes. An Adam optimizer with a learning rate of 0.01 is set for use, and the adjusted and classified results of the nodes are obtained.

In Step 4.3, the GCN is used to classify the nodes in the population, and the preliminary Pareto frontier is supplemented by the classification results to obtain a better Pareto frontier. The NSGA-II algorithm is then used to specifically adjust the nodes in the Pareto frontier to make the distribution of the Pareto frontier more uniform. The specific steps include the followings.

In Step 4.3.1, the GCN is used to classify nodes. The nodes are classified according to the classification results. The number of the nodes in each classification will be supplemented, and the Pareto frontier will be better.

In Step 4.3.2, the number of the various node classifications in the above-mentioned better Pareto frontier is calculated. Then, a portion of the nodes in the classifications having relatively more nodes are deleted, and a portion of nodes are generated for the classifications having fewer nodes. The generation rules are as illustrated in FIG. 2.

In Step 4.3.3, the NSGA-II algorithm is used to perform crossover and mutation operations again on the above-mentioned Pareto frontier to obtain a more uniform and accurate Pareto frontier.

In Step 4.3.4, whether the nodes satisfy the constraint conditions is determined, and if the nodes satisfy the constraint conditions, the nodes are retained.

In Step 5, the Pareto frontier is obtained when satisfying the ending conditions, that is, the result of the multi-objective optimization is achieved, and each objective efficiency and the set of reservoir operation schemes are determined.

Figure 5:
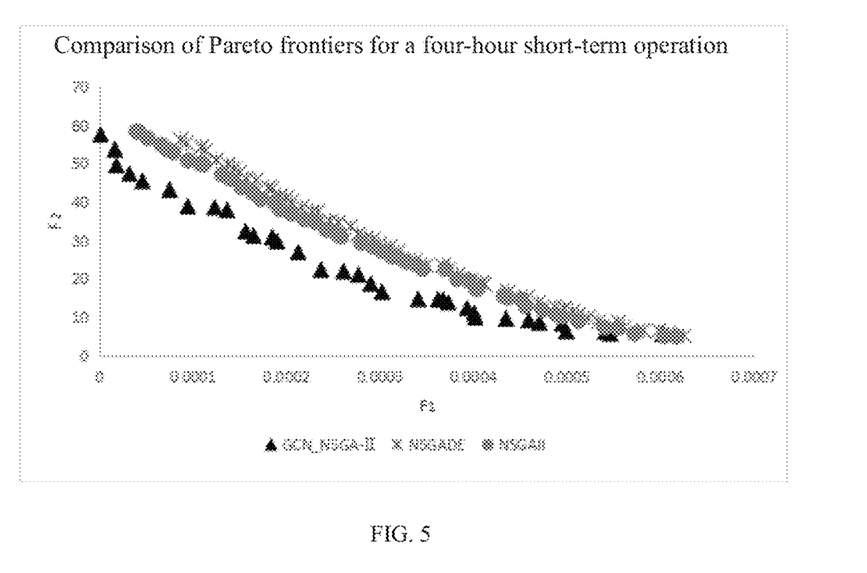
FIG. 5 illustrates a comparison diagram of Pareto frontiers obtained by three algorithms according to an embodiment of the present disclosure.

The method provided by the present disclosure is applied to the multi-objective optimal operation of the Xiaolangdi Reservoir during the flood season, in which the NSGA-II algorithm and the NSGADE algorithm are compared with each other with a small operation interval of four hours and a total duration of 72 hours as an example. It can be seen from FIG. 5 that the Pareto solution set obtained by the method of the present disclosure is better than that of the NSGA-II algorithm and that of the NSGADE algorithm. Moreover, by comparing the IGD values and HV values obtained by the three algorithms, it also shows that the algorithm provided by the present disclosure has obvious advantages in the convergence speed, wherein the IGD value is used to evaluate the convergence and diversity of the algorithm by measuring the conformability degree between the true Pareto frontier and the Pareto frontier obtained by the algorithm, and the HV value is used to measure the range covered by the Pareto solution set obtained by the algorithm in the objective space, which can evaluate the convergence and diversity at the same time. The less the IGD value, the better the convergence of the Pareto frontier obtained by the algorithm and the more uniform the distribution. The greater the HV, the better the convergence of the Pareto frontier obtained by the algorithm and the more uniform the distribution. The detailed comparison is as follows.

| Algorithm Comparison | | | | | |
| --- | --- | --- | --- | --- | --- |
| | NSGADE | | NSGAII | | GCN_NSGA-II | |
| Algebra | IGD | HV | IGD | HV | IGD | HV |
| 100 | 7.132 | 0.901 | 6.132 | 0.881 | Training | Training |
| 200 | 2.511 | 0.903 | 3.511 | 0.903 | Training | Training |
| 300 | 1.111 | 0.909 | 3.111 | 0.905 | 1.961 | 0.906 |
| 400 | 0.355 | 0.911 | 2.451 | 0.908 | 1.723 | 0.912 |
| 500 | 0.279 | 0.912 | 5.279 | 0.911 | 0.839 | 0.918 |
| 600 | 0.272 | 0.913 | 1.872 | 0.915 | 0.831- | 0.920 |
| 700 | 0.268 | 0.913 | 1.668 | 0.920 | 0.826 | 0.922 |
| 800 | 0.262 | 0.915 | 1.262 | 0.923 | 0.823 | 0.924 |
| 900 | 0.254 | 0.916 | 0.851 | 0.926 | 0.822 | 0.925 |
| 1000 | 0.251 | 0.918 | 0.554 | 0.928 | 0.821 | 0.926 |

To sum up, the multi-objective optimization problem of the reservoir operation during flood seasons is modeled in the present disclosure, and the influence of two objectives of the dam level and the maximum discharge volume on the reservoir operation scheme is considered during the flood seasons. According to the specific factors such as the specific reservoir and the surrounding environment, a specific model is further established. A set of operation schemes that satisfy all the objectives can be obtained by using the algorithm provided in the present disclosure. A reasonable reservoir operation scheme cannot only maximize efficiencies for many parties, but also can ensure less damage to the ecological environment.

What is claimed is:

1. A method for optimizing a reservoir operation for multiple objectives based on a graph convolutional neural network (GCN) and a Non-Dominated Sorting Genetic Algorithm (NSGA-II algorithm), wherein the method comprises following steps:

Step 1, collecting relevant data for reservoir flood-control operation and establishing a multi-objective optimization model for the reservoir operation;

Step 2, obtaining an initial population of a multi-objective optimization problem for the reservoir operation by using the NSGA-II algorithm, grouping individuals in the population by an encoding operation and marking the individuals with classifications, each of which is taken as a node in a GCN graphic structure, and mapping parent-child relationships obtained by crossover and mutation operations as edges between nodes in the GCN graphic structure, to obtain the GCN graphic structure and a preliminary Pareto frontier;

Step 3, grouping and labeling abscissas of the preliminary Pareto frontier obtained in Step 2, and then training a GCN model by using the grouping labels and the GCN graphic structure obtained in Step 2;

Step 4, classifying the nodes in the GCN graphic structure by using the trained GCN model, and then adjusting a uniformity of the Pareto frontier by using the NSGA-II algorithm until an algorithm iteration ends, to obtain a more uniform Pareto frontier; and Step 5, outputting, according to the more uniform Pareto frontier obtained in Step 4, a set of non-inferior schemes of the multi-objective optimization problem for the reservoir operation.

2. The method for optimizing the reservoir operation for the multiple objectives based on the graph convolutional neural network and the NSGA-II algorithm according to claim 1, wherein the objectives considered in the multi-objective optimization model for the reservoir operation in Step 1 comprise:

firstly, minimizing an upstream water level and ensuring that the reservoir maintains a low water level during a flood season, thereby ensuring safety of a dam; and secondly, minimizing a maximum discharge volume in the reservoir, and storing as much floodwater as possible by the reservoir to ensure safety in a downstream to minimize an inundation loss.

3. The method for optimizing the reservoir operation for the multiple objectives based on the graph convolutional neural network and the NSGA-II algorithm according to claim 1, wherein Step 2 specifically comprises:

Step 2.1, randomly initializing the population of the multi-objective optimization problem for the reservoir operation, encoding the individuals in the population according to a following encoding method, and taking encoded individual classifications as the nodes in the GCN graphic structure; making, through the encoding method, a plurality of individuals in the population belong to a same classification represented by a same node, to avoid a redundancy in the graphic structure caused by too many individuals in the population;

the encoding method being that: a definition domain of the maximum discharge flow Qmax is divided at an equal distance, each distance is $\lceil Q_{max}/N \rceil$, where Qmax is the maximum discharge volume, and N is a number of classifications, that is, a number of nodes in the GCN graphic structure, and the individuals are encoded by using a method $\lceil Q/\lceil Q_{max}/N \rceil \rceil$; the Pareto frontier is divided at an equal distance by the abscissas, intervals of which are defined as 0, 1, 2 . . . , wherein a node 0 is defined as an elimination node, and a length of a gene sequence in the population is determined by a number of variables; and Step 2.2, performing the crossover and mutation operations on the individuals in the population in Step 2.1 to determine whether the constraint conditions are satisfied, and pointing codes in the gene sequence of eliminated individuals that satisfy the constraint conditions to the node 0; recording the individuals that satisfy the conditions, and defining the parent-child relationships generated by the crossover and mutation operations as the edges of the graphic structure.

4. The method for optimizing the reservoir operation for the multiple objectives based on the graph convolutional neural network and the NSGA-II algorithm according to claim 1, wherein Step 3 specifically comprises:

Step 3.1, grouping and labeling the preliminary Pareto frontier obtained by the NSGA-II algorithm by the abscissas, that is, dividing a value domain of an objective function at an equal distance, to define digital labels;

Step 3.2, setting input parameters, representing relationships between the individuals in the population by an adjacency matrix $A \in R^{N \times N}$ in the graph convolutional neural network, and initializing a characteristic matrix $X \in R^{N \times D}$;

Step 3.3, taking an input layer with N individuals as a first portion, that is, constituting an N-layered input layer with N nodes in the graph, where the characteristic matrix X and the adjacency matrix A serve as inputs;

Step 3.4, taking a convolutional layer composed of two layers of graph convolutions as a second portion, and transmitting characteristics of a base layer to a next layer by trigging information transmission of the edges between the two layers; and Step 3.5, taking an output layer as a third portion, and outputting, for the characteristic matrix X obtained by calculating and transmitting of the two layers of convolutional layers, in turn a classification probability of each of the nodes through an activation function.

5. The method for optimizing the reservoir operation for the multiple objectives based on the graph convolutional neural network and the NSGA-II algorithm according to claim 1, wherein Step 4 specifically comprises:

Step 4.1, obtaining the preliminary Pareto frontier by the NSGA-II algorithm through selection, crossover and mutation operations, generating, during the process, relationships of a parent-child tree-shaped structure between the individuals in the population of the multi-objective optimization problem for the reservoir operation, and converting the tree-shaped structure into the GCN graphic structure;

Step 4.2, determining whether the population iteration threshold is satisfied, and if satisfied, starting training the GCN, learning node characteristics in a population evolution relationship graphic network, and making a node classification result correspond to a classification of the Pareto frontier; and Step 4.3, classifying the nodes by using the GCN, and then adjusting the individuals in the Pareto frontier through a loop iteration by using the NSGA-II algorithm, which specifically comprises following steps:

Step 4.3.1, classifying the nodes by using the GCN, and supplementing and improving the preliminary Pareto frontier;

Step 4.3.2, traversing the nodes with different classifications in the Pareto frontier, deleting redundant nodes with a same classification, and increasing population of classifications with a fewer number, to increase differences;

Step 4.3.3, performing the crossover and mutation operations on the nodes with a good performance obtained through the GCN classification by using the NSGA-II algorithm to obtain new nodes; and Step 4.3.4, determining whether the nodes satisfy the constraint conditions, and retaining, if satisfied, the nodes.

* * * * *